UNITED STATES PATENT OFFICE.

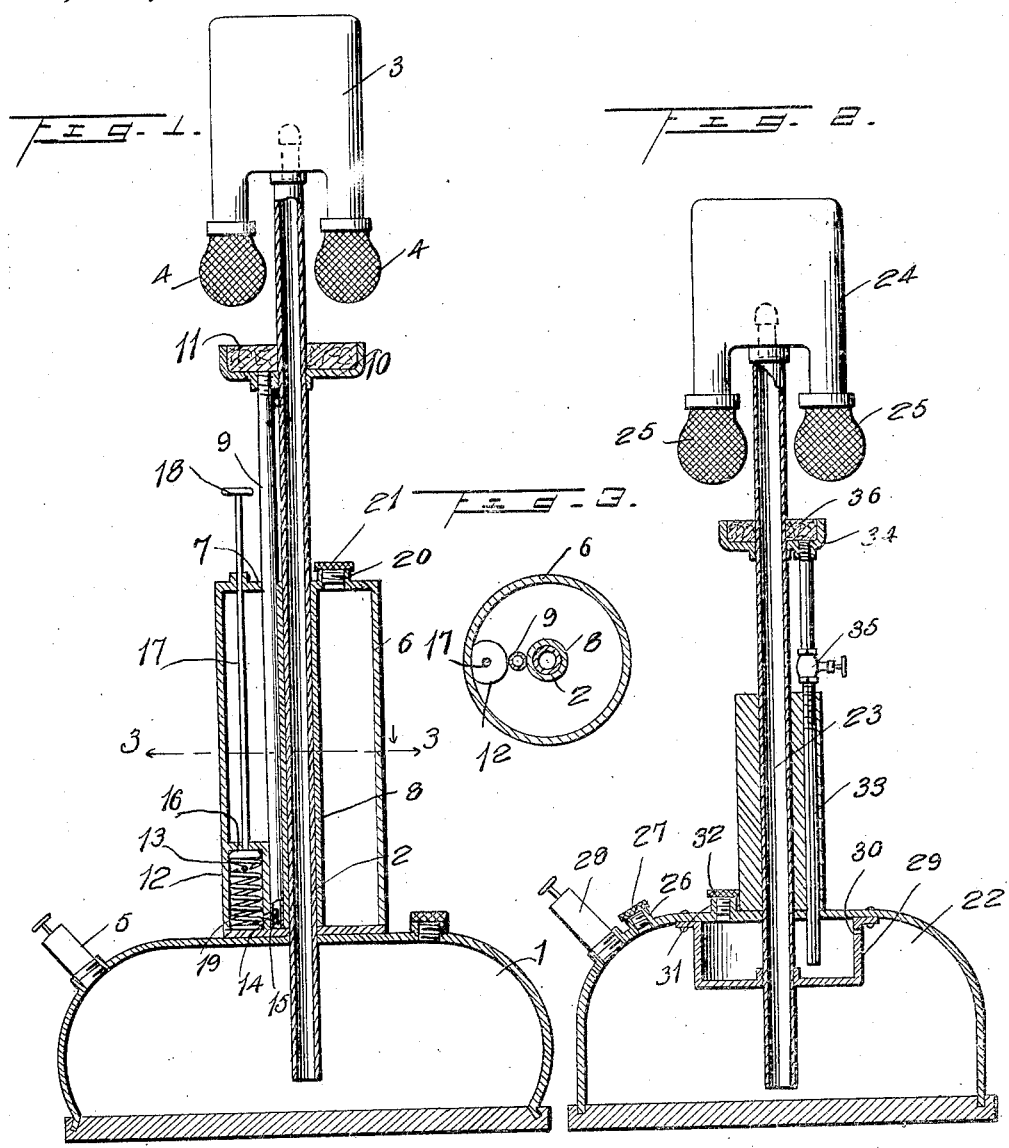

IVAN H. SEVERANCE, OF HARLOWTON, MONTANA.

STARTER FOR VAPOR-BURNERS.

1,362,966.  Specification of Letters Patent.  Patented Dec. 21, 1920.

Application filed February 15, 1918. Serial No. 217,339.

*To all whom it may concern:*

Be it known that I, IVAN H. SEVERANCE, a citizen of the United States, residing at Harlowton, in the county of Wheatland and State of Montana, have invented certain new and useful Improvements in Starters for Vapor Burners; and I do hereby declare the following to be a full, clear, and exact description of the invention, such as will enable others skilled in the art to which it appertains to make and use the same.

This invention relates to improvements in attachments for hydrocarbon lamps of the type in which the fuel is heated and forced through the burner under pressure, and has for one of its objects the provision of means which can be readily actuated to heat the retort prior to lighting the burner, so that the fuel will be thoroughly vaporized and placed in a condition for ignition.

Another object of this invention is the provision of a receptacle carrying fuel adapted to be attached to a hydrocarbon lamp and provided with a heating cup fed with fuel from the receptacle for heating the retort so that the fuel passing through the same will be thoroughly vaporized and placed in a condition for ignition.

A further object of this invention is the provision of a starter for hydrocarbon lamps of the above stated character, which shall be simple, durable and efficient, and which may be manufactured and sold at a comparatively low cost.

With these and other objects in view as will become more apparent as the description proceeds, the invention consists in certain novel features of construction, combination, and arrangement of parts as will be hereinafter more fully described and claimed.

For a complete understanding of my invention, reference is to be had to the following description and accompanying drawing in which:—

Figure 1 is a vertical sectional view of a starter for vapor burners constructed in accordance with my invention, Fig. 2 is a vertical sectional view of a modified form of my invention, Fig. 3 is a transverse sectional view taken on the line 3—3 of Fig. 1, Fig. 4 is a detail sectional view of a valve.

Referring in detail to the drawing, the numeral 1 indicates the bowl or reservoir of a hydrocarbon burner which has connected thereto the usual retort 2 on which is mounted a burner head 3. The bowl or reservoir 1 is adapted to be filled with liquid fuel such as kerosene, gasolene or the like and which fuel is adapted to be forced from the bowl or reservoir 1 upwardly through the retort 2 and then to the burner head 3 by means of air pressure. The air pressure is created within the bowl or reservoir 1 by a hand pump 5 carried by the bowl or reservoir. The foregoing description relates to a well known construction of hydrocarbon lamp to which my invention is applied.

A receptacle 6 is provided with a central passage 8 that receives the retort 2 so as to position the receptacle 6 upon the bowl or reservoir 1 as clearly illustrated in Fig. 1. An auxiliary feed pipe 9 is received by the opening 7 in the receptacle 6 and extends upwardly parallel with the retort 2 and has mounted upon its upper end a heating cup 10. The heating cup 10 also receives the retort 2 of the lamp and has positioned therein absorbent material 11, such as asbestos or the like.

The receptacle 6 has formed therein an auxiliary chamber 12 that is in communication with the interior of the receptacle 6 by way of a port 13 which permits the fuel contained within the receptacle 6 to pass within the auxiliary chamber 12. The auxiliary chamber 12 communicates with the auxiliary feed pipe 9 by way of a port 14 in which is positioned a check valve 15.

A piston 16 is slidably mounted in the auxiliary chamber 12 and has secured thereto a piston rod 17 that extends upwardly through the top wall of the receptacle 6 and has secured to its upper end a suitable hand grip 18. A coil spring 19 is interposed between the bottom wall of the auxiliary chamber 12 and piston 16 for normally holding the piston in an elevated position as illustrated in Fig. 1. The receptacle 6 is provided with a filling spout 20 so that the same can be readily filled with alcohol or other flammable material and is closed by a cap 21.

In operation, when it is desired to light the hydrocarbon lamp, the alcohol within the receptacle 6 is forced upwardly into the cup 10 by actuating the piston 16. The fuel within the cup 10 is then lighted by a match or the like so that the flames thereof will heat the retort 2 and burner head 3. As the retort 2 becomes heated, the fuel passing from the reservoir or bowl 1 under the air pressure by way of the retort 2 becomes thoroughly heated, producing a combustible vapor which readily ignites at the burners 4. It will therefore be noted that an auxiliary attachment has been provided which can be readily and conveniently applied to a hydrocarbon lamp for the purpose of lighting the same thus obviating the use of hand torches and the like now employed to initially heat the retort prior to lighting the lamp.

From the foregoing description it will be noted that my novel attachment can be readily and conveniently applied to hydrocarbon lamps of different characters and also may be conveniently applied to hydrocarbon lanterns.

Referring to my modified form of invention, as illustrated in Fig. 2, it consists of a bowl or reservoir 22 having a retort 23 on which is mounted a burner head 24 carrying burners 25. The bowl or reservoir 22 is provided with a filling spout 26 that is closed by a cap 27. A hand air pump 28 is also located upon the bowl or reservoir 22 for the purpose of placing the fuel therein under air pressure.

An auxiliary chamber or receptacle 29 is secured within the bowl or reservoir 22 and is provided with a port 30 that communicates with the interior of the bowl or reservoir 22 so as to receive air pressure therefrom.

The auxiliary receptacle or chamber 29 is provided with a filling spout 31 that is closed by a cap 32 providing means whereby the same may be readily filled with alcohol or like inflammable material. An auxiliary feed pipe 33 leads from the auxiliary chamber or receptacle 29 to an igniting cup 34 located upon the retort 23 at a point below the burner head as clearly illustrated in Fig. 2. A controlling valve 35 is located in the auxiliary feed pipe 33 for the purpose of controlling fuel therethrough.

In operation, when desiring to light my modified form of hydrocarbon lamp, the fuel within the bowl or receptacle 22 is placed under air pressure by means of the pump 28 and the valve 35 is opened permitting the air pressure within the bowl or reservoir 22 to force the fuel in the receptacle upwardly through the pipe 33 into the cup 34. The fuel in the cup 34 is ignited by a match or other means so that the flames of the fuel will heat the retort 23 and the burner head 24. As the retort 23 becomes thoroughly heated, the fuel passing upwardly through the same will become heated and turn to a vapor which will ignite when entering the burners 25.

The cup 34 is provided with an absorbent lining 36 of asbestos or like material, and a suitable handle 33′ receives the retort 23 and pipe 33 so that the device may be readily carried.

While I have shown and described the preferred embodiment of my invention, it will be understood that minor changes in construction, combination and arrangement of parts may be made without departing from the spirit and scope of the invention as claimed.

Having thus described my invention, what I claim is:

In combination, a hydrocarbon lamp including a bowl connected to a burner by a retort, a priming receptacle, a priming cup mounted on the retort above the receptacle, a tubular member for the said receptacle and extending through the ends thereof and receiving the retort to permit the receptacle to rest on the bowl, a cylinder formed on the lower end of the receptacle and in communication therewith, a spring pressed piston in said cylinder, a pipe in communication with the cylinder and extending through the receptacle and connected to the cup, a check valve between said pipe and cylinder, and a piston stem for said piston and extending through the cylinder and receptacle.

In testimony whereof I affix my signature in presence of two witnesses.

IVAN H. SEVERANCE.

Witnesses:
THOMAS MANNIX.
GUY L. WALLACE.